F. E. RICE.
Ash-Sifters.
No. 150,713.           Patented May 12, 1874.
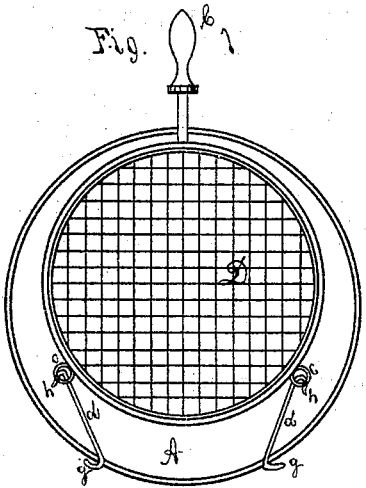
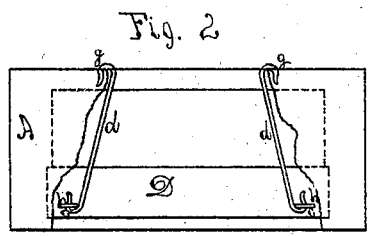
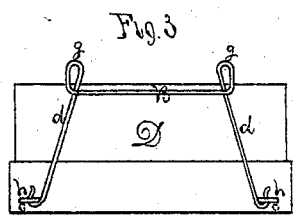
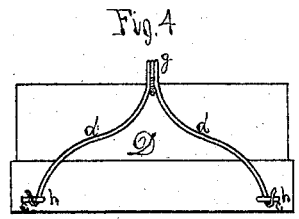
Witnesses.  
Charles J. Eastman  
John E. Crane
Inventor.  
Frank E. Rice

UNITED STATES PATENT OFFICE.

FRANK E. RICE, OF LOWELL, MASSACHUSETTS, ASSIGNOR TO HIMSELF AND HENRY A. HILDRETH, OF SAME PLACE.

IMPROVEMENT IN ASH-SIFTERS.

Specification forming part of Letters Patent No. 150,713, dated May 12, 1874; application filed January 2, 1874.

*To all whom it may concern:*

Be it known that I, FRANK E. RICE, of Lowell, in the county of Middlesex and State of Massachusetts, have invented a new and useful Improvement in Coal-Sifters, of which the following is a full, clear, and exact description, reference being had to the accompanying drawing making part of this specification, in which—

Figure 1 is a plan or top view; and Fig. 2, a side elevation, with a portion of the ash-tank removed to show the suspending-hooks. Figs. 3 and 4 are modifications of my invention.

This invention relates to that kind of coal-sifters which are suspended from the top of the ash tank or cask, and which are moved backward and forward or oscillated to sift the coal. This invention has for its object to provide a cheaper and better coal-sifter than has heretofore been made—a coal-sifter that shall not be liable to get out of order, or have its operative parts detached, misplaced, broken, injured, or lost when not in use, said parts being always attached or connected to the sieve or sifting-instrument. This invention consists of the combination of the two hook-rods $d$ and the supporting and operating handle C with the sieve D and the ash-receiver A, the hook-rods being always connected to and carried by the sieve, and attached by eyes or hooks at their lower ends passing through eyes projecting from the rim of the sieve at the forward side thereof, and at a suitable distance apart to prevent the sieve rocking when in use. Said rods have hooks to catch or hook onto the top edges of the ash-receiver, and the handle C, attached to the sieve and projecting outward, serves as a support for that side of the sieve, and as an operating element, in combination with the hook-rods, to work the sieve, either forward and backward or sidewise, with irregular or unequal motions, and in one direction more than another, and vice versa, as in the judgment of the operator will perform the coal-sifting in the best and most expeditious manner, such irregular and unequal motions, at the discretion of the operator, being much the best for the purpose described. Some lots of ash-mixed coal require more sifting and different action of the sieve to extract the ashes than do other lots, and the action and motions of the sieve which will be effectual in sifting coal in a dry state will not even partially separate the coal and the ashes when wet, as it is sifted, in most cases, to prevent dust.

In the said drawings, A is the ash-receiver, and D the sieve or sifting-instrument, having a handle, C, as usual. Hook-rods $d$ are attached to the sieve by hooks $h$ and by eyes $e$, projecting from the sieve, as shown, and the upper ends of said hook-rods have hooks $g$, which hook onto the top edge of the ash-tank A. The jointed connections of the hook-rods $d$ with the sieve are loose, and work freely in any direction, and without liability of catching, or of hindering the sifting process, whether the sieve is oscillated forward and backward or sidewise, both of these motions being easily performed, as intended or predetermined when constructing the apparatus. The hooks at the upper ends of the rod $d$ are sufficiently open to hook onto the top of the ash-tank and work freely, and these hook-rods, attached to the sifter and hooked onto the tank, furnish leverage-fulcrums sufficient to resist any sidewise motion with force applied to the handle C, to enable the sieve to be operated laterally, as well as forward and backward, and by that means to sift better and more rapidly, as two motions, or motions in opposite directions, are more effectual for sifting than a single motion, which merely throws the mixed coal and ashes to the middle of the sieve. The side motion breaks the uniformity of action, and better disturbs the contents of the sifter.

In constructing the apparatus, if the manufacturer prefers, he may unite the two hook-rods by a bar, B, extending from the point of one hook, $g$, to the point of the other, as shown in Fig. 3, or he may so construct the said hook-rods as to bring the two upper hooks together, as shown in Fig. 4, provided said hook-rods are otherwise constructed and attached to and carried by the sifter, as first described.

I claim as my invention—

The combination of the two hook-rods $d$ and the supporting and operating handle C with the sieve D and the ash-receiver A, all the parts constructed, arranged, and operating in the manner and for the purpose set forth.

FRANK E. RICE.

Witnesses:
CHARLES J. EASTMAN,
JOHN E. CRANE.